US011537317B2

(12) United States Patent
Charles et al.

(10) Patent No.: US 11,537,317 B2
(45) Date of Patent: Dec. 27, 2022

(54) DOCKING ASSEMBLY WITH MULTI-MODE DRIVE CONTROL

(71) Applicant: Microsoft Technology Licensing, LLC, Redmond, WA (US)

(72) Inventors: Sebastien Charles, Morgan Hill, CA (US); Astolfo Rueda, Bainbridge Island, WA (US); Tamer Sherif Mahmoud Abdelaziz, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 141 days.

(21) Appl. No.: 16/405,673

(22) Filed: May 7, 2019

(65) Prior Publication Data

US 2020/0310679 A1    Oct. 1, 2020

Related U.S. Application Data

(60) Provisional application No. 62/824,544, filed on Mar. 27, 2019.

(51) Int. Cl.
*G06F 3/06*         (2006.01)
*G06F 13/16*        (2006.01)

(52) U.S. Cl.
CPC .......... *G06F 3/0658* (2013.01); *G06F 3/0607* (2013.01); *G06F 3/0635* (2013.01);
(Continued)

(58) Field of Classification Search
CPC .... G06F 3/0658; G06F 3/0607; G06F 3/0635; G06F 3/0689; G06F 13/1668; G06F 2213/0028; G06F 1/1632
See application file for complete search history.

(56) References Cited

U.S. PATENT DOCUMENTS 5,173,856 A    12/1992 Purnell et al.
7,917,682 B2    3/2011 Bakthavathsalam
(Continued)

FOREIGN PATENT DOCUMENTS

TW        I257353 B    4/2007

OTHER PUBLICATIONS

"International Search Report and Written Opinion Issued in PCT Application No. PCT/US2020/023045", dated Jun. 24, 2020, 17 Pages.

(Continued)

*Primary Examiner* — Arpan P. Savla
*Assistant Examiner* — Eric T Loonan
(74) *Attorney, Agent, or Firm* — Holzer Patel Drennan

(57) ABSTRACT

The disclosed technology includes a storage system with a docking station configured to serve as an interface between a host computer and a portable data pack including multiple storage drives. The docking station includes a drive-side connection interface that provides a physical and electrical coupling to each of the multiple storage drives in the portable data pack, a RAID controller, and mode selection logic for directing communications in route between the host computer and a select drive of the multiple storage drives along one of two selectable paths within the docking station, the first path permitting the host computer to interact with the select drive through the RAID controller and the second path permitting the host computer to interact with the select drive along a data channel that bypasses the RAID controller.

15 Claims, 5 Drawing Sheets

(52) U.S. Cl.
CPC ........ *G06F 3/0689* (2013.01); *G06F 13/1668*
(2013.01); *G06F 2213/0028* (2013.01)

(56) References Cited

U.S. PATENT DOCUMENTS

| | | | |
|---|---|---|---|
| 8,508,932 | B2 | 8/2013 | Duval |
| 9,152,182 | B1* | 10/2015 | McMahon ............ G06F 1/1658 |
| 9,417,821 | B2 | 8/2016 | Slaight et al. |
| 9,679,424 | B2 | 6/2017 | Plante et al. |
| 10,007,561 | B1 | 6/2018 | Pudipeddi et al. |
| 2005/0047081 | A1 | 3/2005 | Laporte et al. |
| 2005/0083404 | A1 | 4/2005 | Pierce et al. |
| 2005/0100329 | A1 | 5/2005 | Lao et al. |
| 2005/0152110 | A1* | 7/2005 | Chen ................... G11B 33/125 |
| | | | 361/679.32 |
| 2006/0061957 | A1 | 3/2006 | Tip et al. |
| 2010/0046917 | A1* | 2/2010 | Naranjo .............. H04N 13/189 |
| | | | 348/E13.001 |
| 2014/0325146 | A1* | 10/2014 | Madhusudana ....... G06F 3/0689 |
| | | | 711/114 |
| 2016/0195897 | A1* | 7/2016 | Robinson ............. G06F 1/1632 |
| | | | 710/304 |

OTHER PUBLICATIONS

"In-Vehicle Data Capture", Retrieved from: https://www.quantum.com/en/products/in-vehicle-data-capture/, Retrieved Date: Mar. 22, 2019, 08 Pages.

"Quantum R-Series", Retrieved from: https://iq.quantum.com/exLink.asp?584927280G18C121152855166&DS00519A&view=1, Mar. 2019, 02 Pages.

* cited by examiner

DOCKING ASSEMBLY WITH MULTI-MODE DRIVE CONTROL

PRIORITY

The present application claims priority to U.S. Provisional Patent Application 62/824,544 entitled "PORTABLE DATA PACK AND DOCKING ASSEMBLY" and filed on Mar. 27, 2019, which is specifically incorporated by reference for all that it discloses or teaches.

BACKGROUND

As transportation vehicles become more dependent on artificial intelligence, market demand increases for improved in-vehicle data collection and storage solutions. Some self-driving vehicles may collect vast amounts of data such as LIDAR data, camera data, data from various on-board sensors, etc. The amount of data collected is, in some cases, too significant in volume to be transferred from a vehicle to a data center via a cellular internet connection. Current infrastructure does not support large-scale cost-effective solutions for accessing and analyzing such data.

SUMMARY

Figure 1:
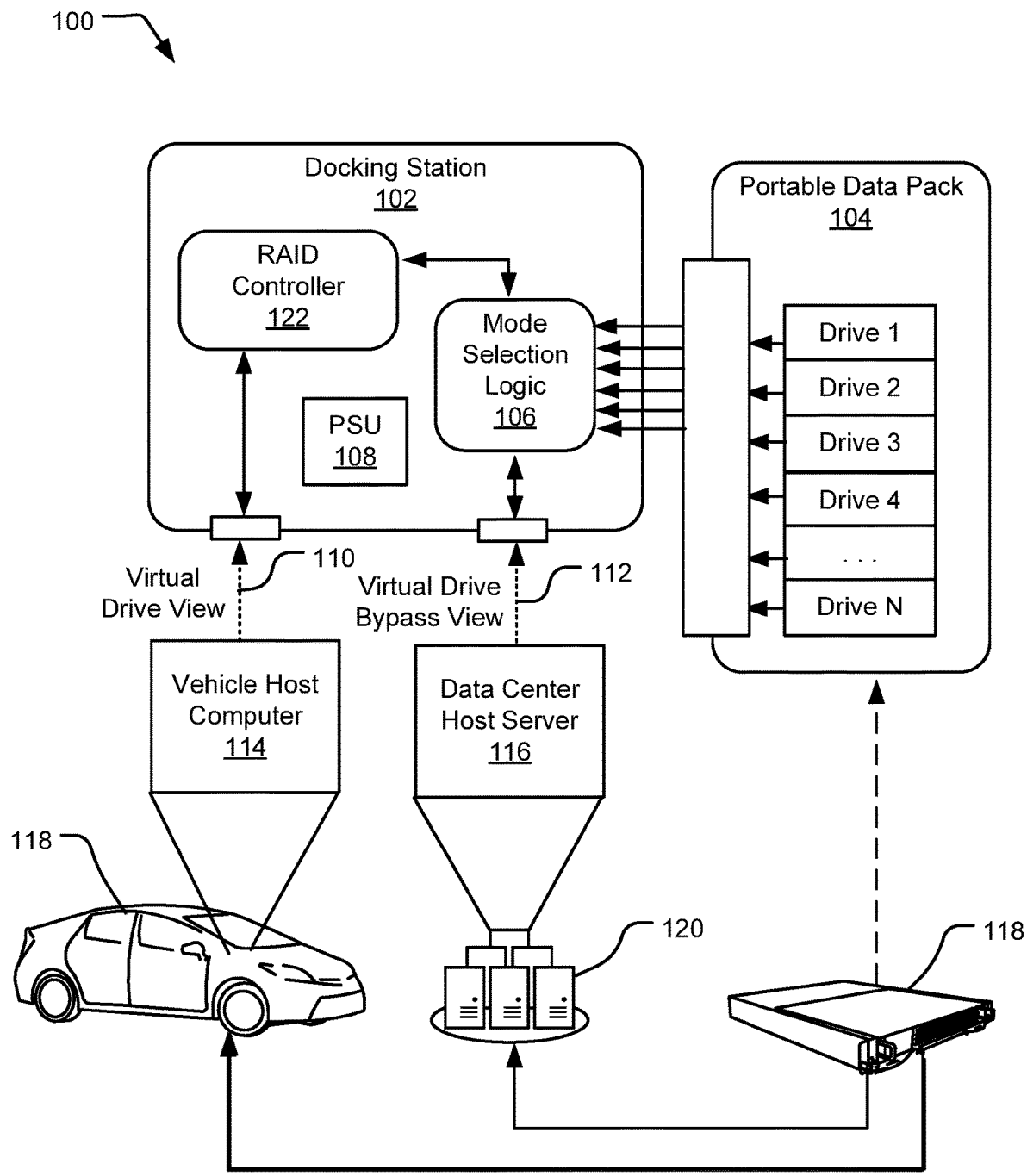
FIG. 1 illustrates an example data storage device that includes a docking station that provides a host computer with selective multi-mode read/write control of drives in portable data pack.

A storage assembly includes a docking station configured to serve as an interface between a host computer and a portable data pack including multiple storage drives. The docking station includes a drive-side connection interface that provides a physical and electrical coupling to each of the multiple storage drives in the portable data pack, a RAID controller, and mode selection logic for directing communications in route between the host computer and a select drive of the multiple storage drives along one of two selectable paths within the docking station. According to one implementation, the first path permits the host computer to interact with the select drive through the RAID controller within the docking station and the second path permits the host computer to interact with the select drive along a data channel that bypasses the RAID controller within the docking station.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

As the automotive and transport industries increase reliance on and use of artificial intelligence technologies, the amount of data collected by in-vehicle computers grows exponentially. Since current cellular bandwidth speeds are too low to support the daily offload of vast amounts of data collected in these smart vehicles, industry leaders are turning to manual data transport and offload solutions in an effort to provide effective oversight of these new technologies.

A variety of challenges impede present efforts to streamline large-scale systems that provide for manual offload (e.g., at a data center) of data that is captured by in-vehicle storage devices. Cost-effective in-vehicle data storage and offload solutions tend to have simplified designs that lack components such internal power reserves and displays to present information that may provide a user with instructions. Since these solutions may be less user-friendly, systems that incorporate these cost-effective solutions may be more difficult to operate. For example, the average taxi or track driver may not, without considerable training, be able to self-initiate data offload operations such as operations to de-couple storage components from a vehicle, re-couple the storage components to a data center host, and initiate an offload of data.

In addition to the above challenges pertaining to operability, still other challenges arise from efforts to mitigate the time required for offload and processing of massive amounts of data collected within vehicles. In-vehicle computer systems may have significantly reduced processing capabilities in comparison to the types of computer systems that may otherwise be available (e.g., external to the vehicle) for aggregating and analyzing collected data. For example, a low-power consumption computer such as an in-vehicle data logger device may lack the capability to self-implement RAID (redundant array of independent disks) technology for redundancy and protection against drive failure. At the same time, a powerful PC may have its own RAID controller that can quickly and/or simultaneously access RAID virtual drives formed by multiple peripheral devices. In light of the above, it is desirable to design a data storage solution that can be accessed and controlled by different types of host computers with varying levels of processing capability while still guaranteeing certain safeguards with respect to reliability and data integrity (e.g., RAID capability).

The herein disclosed technology includes a design for a portable data pack and docking assembly that addresses the foregoing challenges by incorporating features that provide multi-mode read/write control for an external host. According to one implementation, the portable data pack is designed to removably couple to a docking station, such as a docking assembly permanently mounted within a vehicle, data center, or other location. The docking station includes mode selection logic that allows drives within the data pack to be viewed and accessed by a host computer in two discrete and independently-selectable modes.

When the mode selection logic is configured to provide access to the portable data pack in a first mode, communications between the host computer and the drives are routed through a RAID controller included the docking assembly. This internal RAID controller provides system compatibility with low-power consumption host systems, such as host systems lacking an independent RAID controller and/or processing or power resources to support RAID data access.

When the mode selection logic is configured to provide access to the portable data pack in second mode, communications between the host computer and the drives are routed to bypass the RAID controller internal to the docking station, allowing the host computer to see the drives individually and/or utilize its own internal RAID card (external to the docking station and portable data pack) to view and interact with data stored on the drives in the portable data pack. This versatility of drive access options allows a same docking station to be used to record data in-vehicles with limited-power consumption host computing systems and also to offload data in data centers leveraging host servers with comparatively significant processing capability. The use of the same docking station in these two distinct scenarios reduces system-wide implementation costs and reduces the relative skill level needed for an operator to offload data from the portable data back to a location for analysis.

FIG. 1 illustrates an example data storage device 100 that includes a docking station 102 that provides a host computer with selective multi-mode read/write control of drives in portable data pack 104. The docking station 102 is configured for communication with a variety of types of host computers and may, in different implementations, be mounted in different locations for different purposes.

In FIG. 1, dotted arrows 110 and 112 indicate compatibility of the docking station 102 with two types of host computing devices. In one implementation, the docking station 102 is included in a vehicle 118 and configured to provide a host computer within the vehicle 118 with access to drives in the portable data pack 104. For example, the docking station 102 may be permanently or removably mounted within the vehicle 118 and coupled to a vehicle host computer 114. In this implementation, the vehicle host computer 114 provides the docking station with control and/or power signals. The docking station 102 acts as an interface to provide the vehicle host computer 114 with read and write access to drives (e.g., drives 1-N) within the portable data pack 104 when the portable data pack 104 is selectively coupled to the docking station 102 within the vehicle 118, such as when the vehicle 118 is in transit. When the portable data pack 104 is coupled to the docking station 102, the vehicle host computer 114 may send control signals through the docking station to the various drives 1-N.

In the same or another implementation, the docking station 102 is located at a data center 120 and configured to provide a data center host server 116 with access to the drives in the portable data pack 104 whenever the portable data pack 104 is physically coupled to the docking station 102 at the data center 120. Here, the docking station 102 acts as an interface between the data center host server 116 and the portable data pack 104, such as to enable data offload at the data center 120.

The docking station 102 is designed to serve as a universal interface that provides different types of host systems (e.g., the vehicle host computer 114 or the data center host server 116) with access the same portable data pack 104. Although FIG. 1 shows a single instance of the docking station 102, FIG. 1 is intended to illustrate the potential for duplicate instances of the docking station 102 that may be used at different times for recording and offloading data. For example, multiple instances of the docking station 102 may be used within the same system, such as to facilitate recordation of data on the portable data pack 104 and the subsequent transfer of captured data from the portable data pack 104 to a more permanent storage location. Different versions of the docking station 102 within a same system may be identical or different from one another (e.g., with some hardware and/or software components different from that shown and described herein). For instance, to optimize costs, the docking station 102 attached to the data center host server 116 may not have a RAID controller embedded. As discussed below, the docking station 102 may instead be utilized leverage the higher compute capabilities of the data center host server 116.

In some implementations, different types of host systems may have very different power and memory capabilities. For example, the vehicle host computer 114 may be a processing device with a lower processing capability CPU optimized for power consumption and embedded systems. In contrast, the data center host server 116 may be a processing device with comparatively higher processing capabilities, including hardware RAID processing capabilities. For example, the data center host computer may have two high cores count CPUs per motherboard and a built-in RAID controller that can be shared and reused across multiple portable disk packs.

In one implementation, the portable data pack 104 includes an outer enclosure encasing a number of non-volatile storage media represented as drives 1-N in FIG. 1. These drives may have characteristics that are identical or disparate from one another. In various implementations, the drives 1-N may include one or more or a combination of hard drive disks (HDDs), optical disks, solid state drives ("SSDs"), flash memory, and the like. In one example implementation, the portable data pack 104 houses multiple solid state devices and various circuitry and electrical ports for coupling each of the SSDs communication channels within the docking station 102 when the portable data pack 104 is coupled to the docking station 102.

In some implementations, the drives 1-N of the portable data pack 104 are managed as a RAID array. Using RAID, data on the drives in the portable data pack 104 is written using various techniques such as mirroring, parity, and/or striping, to ensure data redundancy and thereby safeguard against drive failure.

When reading and writing data to the portable data pack 104, the drives (e.g., Drive 1-N) may be managed as a RAID virtual array. In general, a RAID array is managed by a RAID controller (e.g., a RAID controller 122), which has the ability to access multiple copies of duplicate data on different drives in the array and thereby implement procedures to improve performance in the event of a system crash. RAID controllers may assume a variety of different forms including pure software or a mix of hardware and software. Notably, higher-end processing devices designed for intensive processing and data analysis, such as the data center host server 116, may be manufactured to include an independent RAID controllers In some implementations, lower-end processing devices, such as in-vehicle computers (e.g., the vehicle host computer 114) and mobile electronics do not independently include a RAID controller. Thus, there exists the possibility that the portable data pack 104 could be selectively accessed by first host with internal RAID capability and subsequently accessed by a second host that lacks independent RAID control.

To provide RAID support regardless of host capabilities while also leveraging host processing assets, the docking station 102 includes mode selection logic 106 that is selectively configurable to provide the associated host computer (e.g., the vehicle host computer 114 or the data center host server 116) with two different alterative mechanisms for viewing and accessing the drives within the portable data pack 104.

When the mode selection logic 106 is configured in a virtual drive mode, control signals and read/write data passing between the portable data pack 104 and the host computer (e.g., vehicle host computer 114) are routed through a RAID controller 122 that is internal to the docking station 102. For example, the RAID controller 122 may take the form of a PCI or PCI Express (PCIe) card, which is designed to support a specific drive format such as SATA (serial advanced technology attachment) or SCSI (small computer system interface). In this mode, the host computer receives signals that are interpretable to view the array of drives in the portable data pack 104 as a virtual drive (e.g., with visibility regarding redundancies across drives).

When the mode selection logic 106 is configured in a virtual drive bypass mode, control signals and read/write data passing between the portable data pack 104 and the host computer (e.g., the data center host server 116) bypass the RAID controller 122 that is internal to the docking station 102. In this mode, the host computer receives signals from the drives 1-N that are not arranged in a way so as to alone provide the host with visibility of the virtual drive (e.g., the locations of data redundancies). In this mode, the host computer may use its own internal RAID controller when viewing and accessing the drives 1-N (e.g., as a RAID virtual drive). In yet other implementations, the virtual drive bypass mode is usable to provide a host computer with visibility of each of the drives 1-N individually (e.g., without using a RAID controller), such as via a SAS host bus adaptor in the hosts system that provides direct visibility and communication with individual drives in isolation of one another.

The above two different drive access modes—virtual drive mode and virtual drive bypass mode—provide the host with different levels of control and visibility that are selectable so as to provide for various levels of data management and control tailored to the unique needs and/or requirements of the host computing system and/or facility. For example, the data center host server 116 may be a powerful PC with its own RAID controller. This RAID controller may be designed to couple to multiple docking stations at once with the mode selection logic 106 of each docking station configured in the virtual drive bypass mode. In this manner, the RAID controller internal to the data center host server 116 may provide simultaneous access to the multiple different drives of the multiple different portable data packs.

In FIG. 1, the docking station 102 is also shown to include a power supply unit (PSU) 108 which includes, for example, an AC-to-DC converter and an AC power connector for powering the docking station 102 to draw power from an AC source, such as an electrical outlet in a data center. In another implementation, the docking station 102 includes a DC power connector (not shown) in addition to or in lieu of the PSU 108, such as to enable the docking station 102 to draw power from a car battery. In at least one implementation, the portable data pack 104 has no independent power source (e.g., no battery) and is powered through the electrical couplings to the docking station 102.

Although not shown, the portable data pack 104 may, in some implementations, include a microcontroller and various environmental sensors for collecting data. For example, the microcontroller may include a combination of software and hardware, such as control instructions executed by one or more separate or shared device controllers (e.g., microprocessors), peripheral interface controllers ("PICs"), application-specific integrated circuits ("ASICs"), systems on chips ("SoCs"), etc. Various environmental sensors included within the portable data pack 104 may include a GPS sensors and/or one or more environmental sensors such as temperature sensors, vibration sensors, accelerometers, hygrometer, etc.

Figure 2:
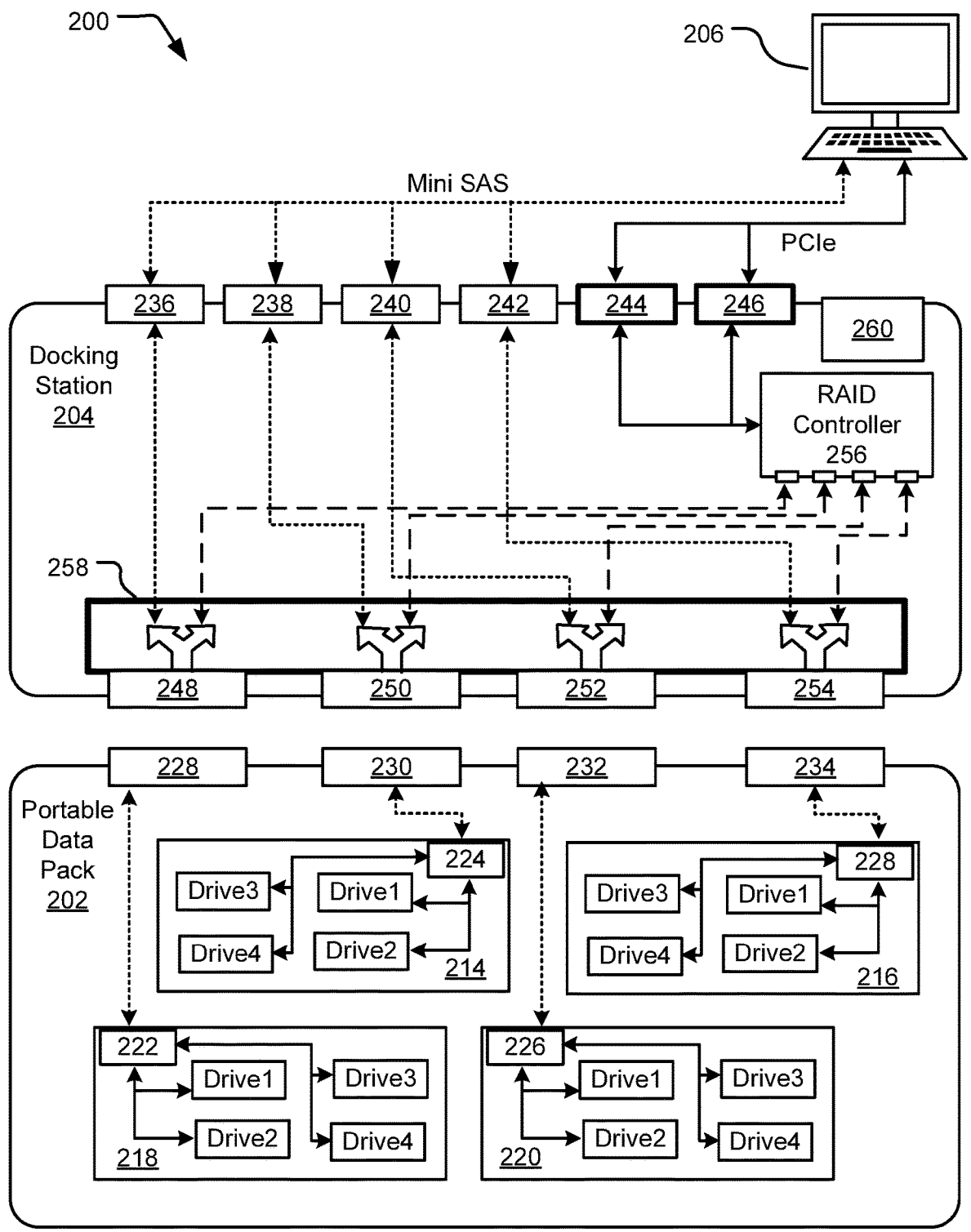
FIG. 2 illustrates an example system with a docking station that includes mode selection logic for multi-mode control over drives in a portable data pack.

FIG. 2 illustrates an example system 200 with a and docking station 204 that includes mode selection logic 258 to provide multi-mode control of drives in a portable data pack 202. The docking station 204 provides a host computer 206 with read and write access to a number of non-volatile storage media (drives) included within the portable data pack 202. In different implementations, the portable data pack 202 may include different types of storage media configured and accessible in different ways. By example and without implementation, the portable data pack 202 of FIG. 2 houses four groups (e.g., groups 214, 216, 218, and 220) of four drives (e.g., drive 1-drive 4 in each group). In one implementation, the drives 1-4 in each group are SSDs. Control signals are provided to each group of drives by way of connections ports 222, 224, 226 and 226 that are each in electrical communication with a corresponding external connection port 228, 230, 232, or 234 on the portable data pack 202.

The docking station 204 serves as an interface that selectively routes control signals and data between the drives in the portable data pack 202 and the host computer 206 based on a currently-selected drive access mode. In FIG. 2, the docking station 204 includes multiple (e.g., four) drive-side connection ports 248, 250, 252, and 254 each designed to couple to a corresponding one of the external connection ports 228, 230, 232, and 234 on the portable data pack 202. The docking station 204 additionally includes multiple host-side connection ports (e.g., 236, 238, 240, 242, 244, and 246) as well as mode selection logic 258 for directing communications in route between the host computer 206 and a select group of drives (e.g., groups 214, 216, 218, and 220) along one of two selectable paths within the docking station 204.

The docking station 204 is configured to permit the host computer 206 to view the drives of the portable data pack 202 in two different modes—a "virtual drive mode" and a "virtual drive bypass mode." In one implementation, these two modes of operation are mutually exclusive and do not operate simultaneously at the same point in time. This dual mode viewing capability may allow different data collection center entities to view, offload, and interact with stored data in whichever manner is preferable based on their respective system configurations.

When the mode selection logic 258 is configured in the virtual drive bypass mode, the host computer 206 has direct visibility to one or more groups (e.g., group 214, 216, 218 or 220) of drives in the portable data pack 202. As used herein, "direct visibility" refers to a connection between two endpoints (e.g., an input to the host computer 206 and an input to a select drive) that does not route data through a RAID controller 256 in the docking station 204. In one implementation, the host computer 206 accesses the drives in the virtual drive bypass mode by utilizing an internal SAS host bus adaptor to send SAS protocol signals through the host-side connection ports 236, 238, 240, and 242. In another implementation, the host computer 206 accesses the drives in the virtual drive bypass mode by utilizing an internal RAID controller and by transmitting SAS protocol signals through the host-side connection ports 236, 238, 240, and 242.

When the mode selection logic 258 is configured in a virtual drive mode, the host computer 206 communicates with the drives through the RAID controller 256 within the docking station 204. For example, the host computer 206 may be equipped with a PCIe switch card that transmits signals of a PCIe protocol through the host-side connection ports 244 or 246 to access the drives in the portable data pack 202 in the virtual drive mode. The PCIe signals are, for example, routed through a PCIe re-driver card (not shown) to the RAID controller 256.

The mode selection logic 258 may include hardware or a selection of hardware and software. According to one implementation, the currently-selected drive access mode (e.g., virtual mode or virtual mode bypass) is determined based on a location of a detected coupling between the host computer 206 and one or more of the host-side connection ports 236, 238, 240, 242, 244, and 246. When, for example, the mode selection logic 258 detects a coupling between the host computer 206 and one or more of the host-side connection ports 236, 238, 240, and 242, data and control signals in route between the host computer 206 and the portable data pack 202 are routed around (e.g., to bypass) the RAID controller 256. In contrast, when the mode selection logic 258 detects a coupling between the host computer 206 and one or more of the host-side connection ports 244 and 246, data and control signals in route between the host computer 206 and the portable data pack 202 are routed through the RAID controller 256.

In another implementation, the mode selection logic 258 includes a microprocessor (not shown) that selectively routes signals through the docking station 204 responsive to firmware commands from a host.

In addition to the above-described features, the docking station 204 includes a power supply unit 260 which may include, for example, an AC-to-DC converter and an AC power connector for drawing power from an AC source, such as an electrical outlet. In another implementation, the power supply unit 260 includes a DC power connector for drawing power from a battery, such as vehicle battery. A power connector (not shown) may route power from the power supply unit 260 to the portable data pack 202. In one implementation, the portable data pack 202 does not include an independent power source. Other aspects of the system 200 not explicitly described herein may be the same or similar to those described with respect to other implementations.

Figure 3:
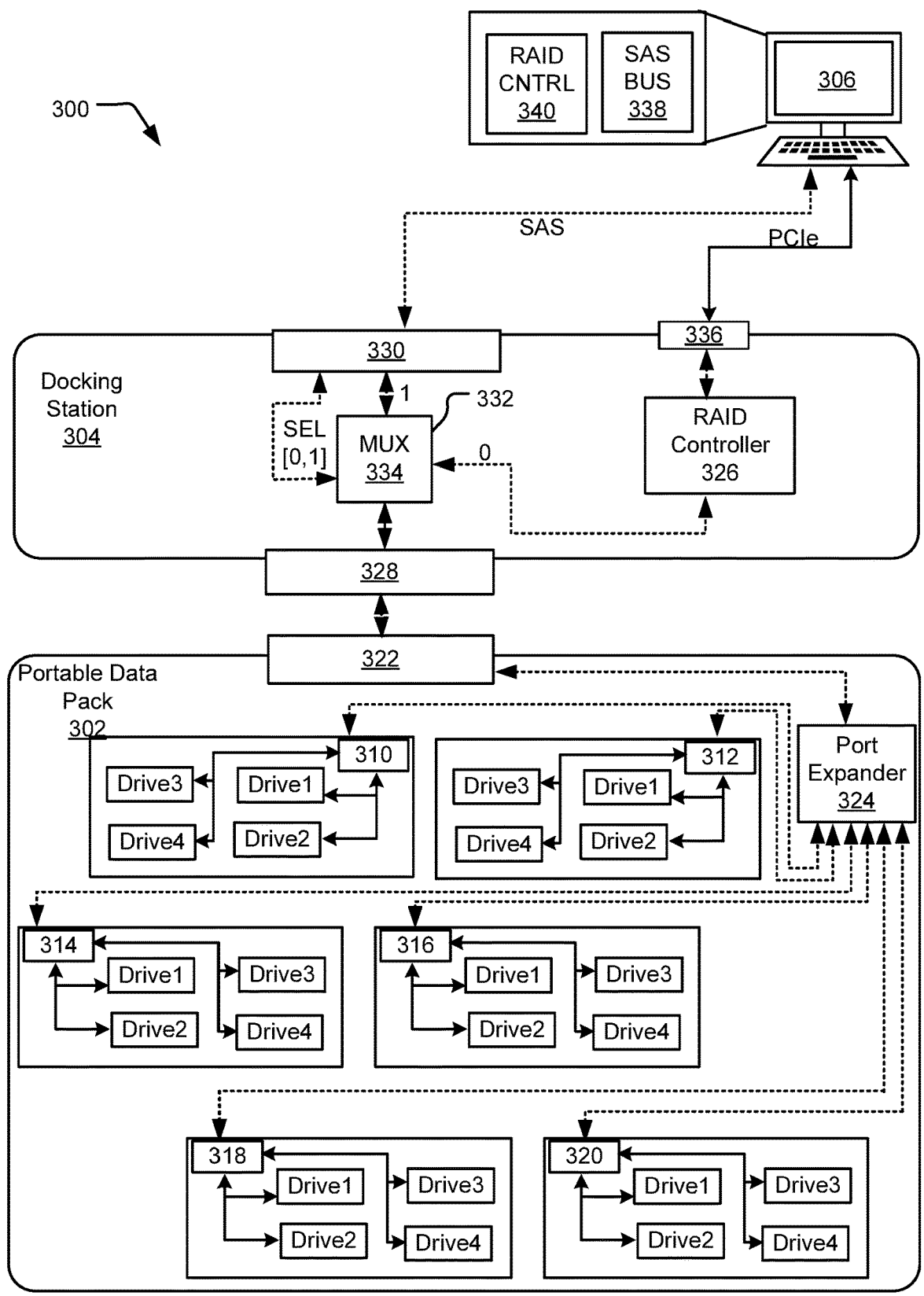
FIG. 3 illustrates another example system with a docking station that includes mode selection logic for multi-mode control over drives in a portable data pack.

FIG. 3 illustrates another example system 300 with a docking station 304 that includes mode selection logic 332 that provides multi-mode control over drives in a portable data pack 302. The docking station 304 includes a RAID controller 326 and a PCIe re-driver card (not shown) that couples the RAID controller to each of multiple storage drives in the portable data pack 302.

By example and without implementation, the portable data pack 302 includes an enclosure housing six groups of four drives (e.g., groups 310, 312, 314, 316, 318, and 320 each having drives labeled drive 1-drive 4). In one implementations, the drives are SSDs. Control signals are provided to each group of drives through a connection interface 322 on the portable data pack 302 which may, for example, include a collection of SAS and power connection ports. Depending on the select hardware configuration, the portable data pack 302 may additionally include a port expander 324 (e.g., a SAS expander to provide connections between the drives in the portable data pack 302 and the RAID controller 326 or an external controller through a limited number of SAS ports in the connection interface 322). The docking station 304 includes multiple drive-side connection ports collectively represented as a drive-side connection interface 328, which is configured to couple with and provide data signal connectivity to the connection interface 322.

The docking station 304 additionally includes multiple host-side connection ports represented collectively as a host-side connection interface 330. The mode selection logic 332 within the docking station 304 includes routing circuitry for directing communications received from the various drives in the portable data pack 302 to the host computer 306 along one of two selectable paths (e.g., paths labeled '0' and '1') within the docking station 202. By way of example and without limitation, the mode selection logic 332 includes a multiplexor 334.

When the host computer 306 is coupled to the host-side connection interface 336 rather than the host-side connection interface 330, no input signal is detected along a selection line (SEL) at the host-side connection interface 330, and the multiplexor 334 routes signals received from the drives of the portable data pack 302 along a first path (e.g., path '0' representing a virtual drive mode) through the RAID controller 326 to the host computer 306. In one such implementation, the host computer 306 receives data of a PCIe format from the RAID controller 326 that effectively allows the host to see the various drives in the portable data pack as an array forming a RAID virtual drive.

When the host computer 306 is coupled to the host-side connection interface 330 rather than the host-side connection interface 336, an input signal is received along the select line (SEL) and the multiplexor 334 routes signals received from the drives of the portable data pack 302 along a second path (e.g., path '1', representing a virtual drive bypass mode). This path bypasses the RAID controller 326, allowing the host computer 306 to view the drives individually using a SAS host bus adaptor 338. Alternatively, the host computer 306 may be configured to re-format the data received along the second path using an internal RAID controller 340. Other aspects of the system 300 not explicitly described herein may be the same or similar to those described with respect to other implementations.

Figure 4:
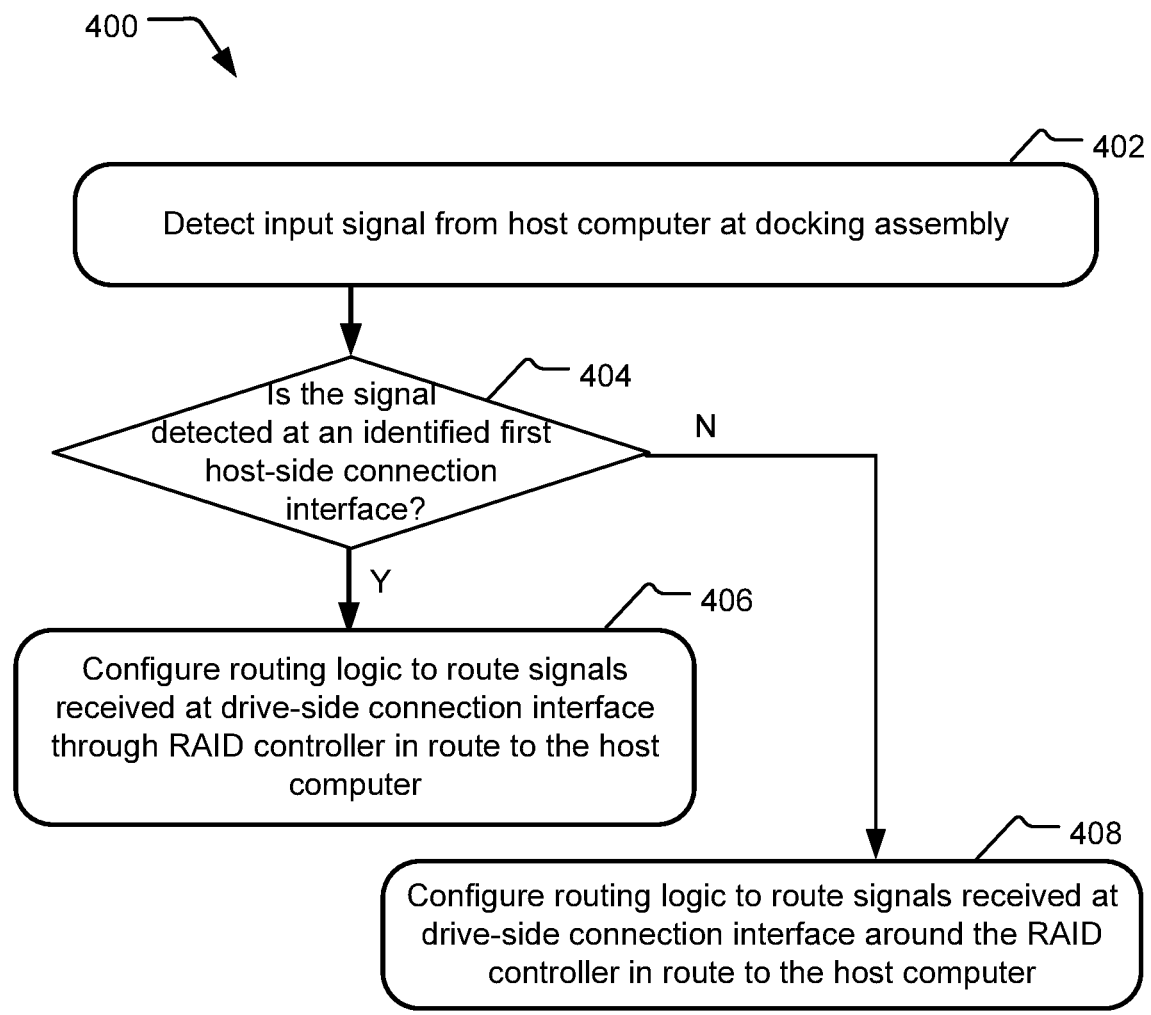
FIG. 4 illustrates example operations for routing data through a docking assembly between drives of a portable data pack and a host computer.

FIG. 4 illustrates example operations 400 for routing data through a docking assembly between drives of a portable data pack and a host computer. According to one implementation, the routing operations are performed by hardware and/or software of a docking assembly that is attached to a portable data pack through a drive-side connection interface and attached to the host computer through one of multiple host-side connection interfaces on the docking assembly.

A detection operation 402 detects an input signal from a host computer one of multiple host-side connection interfaces of a docking assembly. A determination operation 404 determines whether the detected input signal was received through a select one of multiple host-side connection interfaces. If so, a configuration operation 406 configures routing logic to route return signals received at the drive-side connection interface (e.g., from one or more storage drives of the portable data pack) through a RAID controller prior to providing the signals to the host computer.

If the determination operation 404 determines that the detected input signal was not received at the select host-side connection interface (e.g., the signal has been received at a second, different one of the multiple host-side connection interfaces), another configuration operation 408 configures routing logic to route the return signals received at the drive-side connection interface along a route that bypasses the RAID controller such that the signals received at the host computer are not routed through a RAID controller prior to providing the signals to the host computer.

Figure 5:
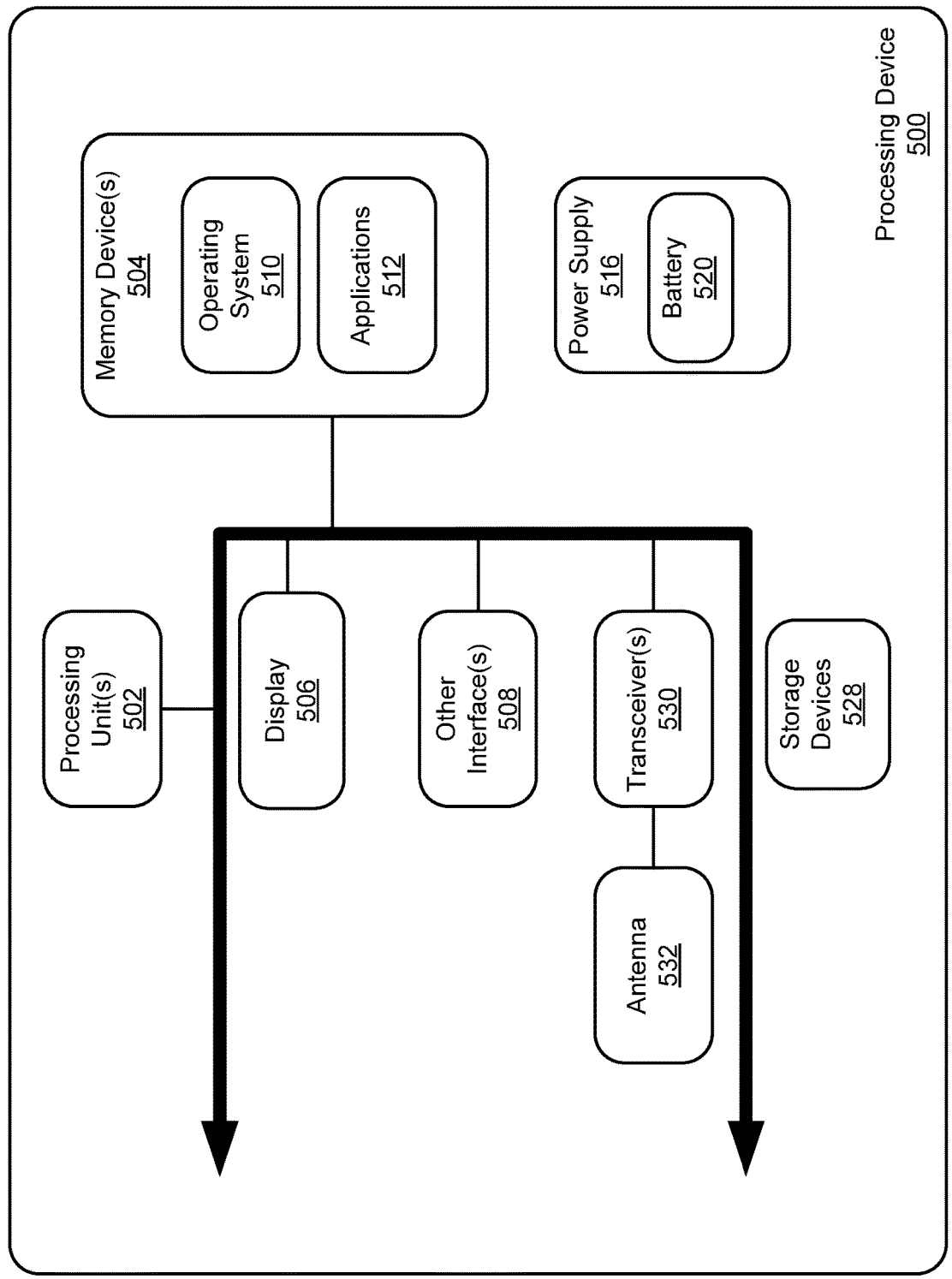
FIG. 5 illustrates an example schematic of a processing device suitable for implementing aspects of the disclosed technology.

FIG. 5 illustrates an example schematic of a processing device 500 suitable for implementing aspects of the disclosed technology. The processing device 500 includes one or more processor unit(s) 502, memory 504, a display 506, and other interfaces 508 (e.g., buttons). The memory 504 generally includes both volatile memory (e.g., RAM) and non-volatile memory (e.g., flash memory). An operating system 510, such as the Microsoft Windows® operating system, the Microsoft Windows® Phone operating system or a specific operating system designed for an embedded device, resides in the memory 504 and is executed by the processor unit(s) 502, although it should be understood that other operating systems may be employed.

One or more applications 512 are loaded in the memory 504 and executed on the operating system 510 by the processor unit(s) 502. The processing device 500 includes a power supply 516, which is powered by one or more batteries or other power sources and which provides power to other components of the processing device 500. The power supply 516 may also be connected to an external power source that overrides or recharges the built-in batteries or other power sources.

The processing device 500 includes one or more communication transceivers 530 and an antenna 532 to provide network connectivity (e.g., a mobile phone network, Wi-Fi®, Bluetooth®). The processing device 500 may also include various other components, such as a positioning system (e.g., a global positioning satellite transceiver), one or more accelerometers, one or more temperature sensors or hygrometers, and storage devices 528. Other configurations may also be employed.

In an example implementation, the processing device 500 couples to a docking station (e.g., docking station 102 in FIG. 1) to access data stored on a portable data pack (e.g., portable data pack 104 in FIG. 1) that removably couples to the docking station.

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 500. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media, such as a wired network or direct-wired connection, and wireless media such as acoustic, RF, infrared and other wireless media.

An example storage system disclosed herein includes a portable data pack including multiple storage drives within an enclosure;
    a docking station configured to serve as an interface between the portable data pack and a host computer, and a RAID controller. The docking station includes at least a drive-side connection interface that provides a physical and electrical coupling to each of the multiple storage drives in the portable data pack as well as mode selection logic for directing communications in route between the host computer and a select drive of the multiple storage drives along one of two selectable paths within the docking station. A first path of the two selectable paths permits the host computer to interact with the select drive through the RAID controller and a second path of the two selectable paths permits the host computer to interact with the select drive along a data channel that bypasses the RAID controller.

In another example storage system of any preceding storage system, the mode selection logic selects between the first path and the second path based on a location of a detected coupling between the host computer and the docking station.

In still yet another example storage system of any preceding storage system, the host computer includes at least one of an internal RAID card and a SAS host bus adapter to interact with the select drive along the first path.

In another example storage system of any preceding storage system, the mode selection logic includes a multiplexor that selects one of multiple available paths for routing each signal received at the drive-side connection interface to the host computer.

In yet another example storage system of any preceding storage system, the first path between the select drive and the host computer directs communications from the select drive through the RAID controller to a first host-side connection interface on the docking station.

In still another example storage system of any preceding storage system, the second path between the select drive and the host computer bypasses the RAID controller and directs the communications to a second host-side connection interface on the docking station.

In still another example storage system of any preceding storage system, the mode selection logic selects the first path when the host computer is coupled to a first host-side connection interface and selects the second path when the host computer is coupled to a second host-side connection interface.

In another example storage system of any preceding storage system, the docking station removably couples to the portable data pack.

An example method disclosed herein provides for detecting a coupling between a host computer and a select port of multiple host-side connection ports in a docking station and, based on a location of the detected coupling, selecting one of two selectable paths along which to direct communications in route between the host computer and a select drive of the multiple storage drives. The docking station is coupled to a portable data pack through a plurality of drive-side connection ports each providing a communication channel between the docking station and one of multiple storage drives in the portable data pack. A first path of the two selectable paths permits the host computer to view the select drive as part of a RAID virtual drive and a second path of the two selectable paths permits the host computer to view the select drive independent of the RAID virtual drive.

In another example method of any preceding method, the docking station includes a RAID controller and the first path between the select drive and the host computer directs communications through the RAID controller.

In still another example method of any preceding method, the second path between the select drive and the host computer bypasses the RAID controller.

In yet still another example method of any preceding method, selecting one of the two selectable paths further comprises selecting one of the two selectable paths based on a location of a detected coupling between the host computer and the docking station.

In still another example method of any preceding method, the host computer includes at least one of an internal RAID card and a SAS host bus adapter to interact with the select drive when the second path is selected.

In yet another example method of any preceding method, selecting one of the two selectable paths further comprises selecting the first path when the host computer is coupled to a first host-side connection interface and selecting the second path when the host computer is coupled to a second host-side connection interface.

In another example method of any preceding method, the docking station removably couples to the portable data pack.

In still another example method of any preceding method, the docking station is configured for attachment to a vehicle.

In another example method of any preceding method, selecting one of the two selectable paths further comprises selecting a path with a multiplexor based on a value detected on a multiplexor selection line.

An example storage assembly disclosed herein includes a docking station configured to serve as an interface between a portable data pack and a host computer. The docking station includes at least a plurality of drive-side connection ports each serving as a coupling to a corresponding one of multiple storage drives in the portable data pack; and mode selection logic for directing communications in route between the host computer and a select drive of the multiple storage drives along one of two selectable paths within the docking station. A first path of the two selectable paths permits the host computer to receive signals from the select drive routed through a RAID controller and a second path of the two selectable paths permits the host computer to interact with the select drive along a data channel that bypasses the RAID controller.

In an example storage assembly of any preceding storage assembly, the mode selection logic selects one of the two selectable paths based on a location of a detected coupling between the host computer and the docking station.

In yet another example storage assembly of any preceding storage assembly, first path directs the communications to a first host-side interface and wherein the second path directs the communications to a second host-side interface.

An example system disclosed herein includes a means for detecting a coupling between a host computer and a select port of multiple host-side connection ports in a docking station and a means for selecting one of two selectable paths along which to direct communications in route between the host computer and a select drive of the multiple storage drives based on a location of the detected coupling. The docking station may be coupled to a portable data pack through a plurality of drive-side connection ports each providing a communication channel between the docking station and one of multiple storage drives in the portable data pack. A first path of the two selectable paths permits the host computer to view the select drive as part of a RAID virtual drive and a second path of the two selectable paths permits the host computer to view the select drive independent of the RAID virtual drive.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification together with the following claims provide a complete description of the structure and use of exemplary implementations.

What is claimed is:

1. A storage system comprising:
   a portable data pack including multiple storage drives within an enclosure; and
   a docking station configured to serve as an interface between the portable data pack and a host computer, the docking station including:
   a RAID controller;
   a drive-side connection interface that provides a physical and electrical coupling to each of the multiple storage drives in the portable data pack;
   a host-side connection interface to provide a physical and electrical coupling from the host computer to a first path of two selectable paths within the docking station to the drive-side connection interface via the RAID controller in the docking station, the host-side connection interface to further provide a second physical and electrical coupling from the host computer to a second path of the two selectable paths within the docking station to the drive-side connection interface bypassing the RAID controller in the docking station; and mode selection logic for directing communications in route between the host computer and a select drive of the multiple storage drives along one of the two selectable paths within the docking station, the first path of the two selectable paths transporting data of a first communication protocol input from the host computer and permitting the host computer and the select drive to bidirectionally communicate through the RAID controller of the docking station; and the second path of the two selectable paths transporting data of a second communication protocol input from the host computer and permitting the host computer to bidirectionally communicate with the select drive through a RAID controller internal to the host computer along a data channel that bypasses the RAID controller in the docking station.

2. The storage system of claim 1, wherein the mode selection logic is configured to:
select the first path of the two selectable paths when the host computer is coupled to a first host-side connection port on the docking station; and
select the second path of the two selectable paths when the host computer is coupled to a second different host-side connection port on the docking station.

3. The storage system of claim 1, wherein the mode selection logic includes a multiplexor that selects one of multiple available paths for routing each signal received at the drive-side connection interface to the host computer.

4. The storage system of claim 1, wherein the host-side connection interface is divided into a first host-side connection interface and a second host-side connection interface, wherein the mode selection logic selects the first path when the host computer is coupled to the first host-side connection interface and selects the second path when the host computer is coupled to the second host-side connection interface.

5. The storage system of claim 1, wherein the docking station removably couples to the portable data pack.

6. A method comprising:
detecting a coupling between a host computer and a select port of multiple host-side connection ports in a docking station, the docking station being coupled to a portable data pack through a plurality of drive-side connection ports each providing a communication channel between the docking station and one of multiple storage drives in the portable data pack; and
based on a location of the detected coupling, selecting one of two selectable paths along which to direct communications in route between the host computer and a select drive of the multiple storage drives, a first path of the two selectable paths permitting the host computer and the select drive to bidirectionally communicate and to allow the host computer to view the select drive as part of a RAID virtual drive using a first communication protocol input from the host computer and a second path of the two selectable paths permitting the host computer to bidirectionally communicate with the select drive and to view the select drive independent of the RAID virtual drive using a second communication protocol input from the host computer different from the first communication protocol.

7. The method of claim 6, wherein selecting one of the two selectable paths further comprises:
selecting the first path of the two selectable paths when the host computer is coupled to a first host-side connection port on the docking station; and
selecting the second path of the two selectable paths when the host computer is coupled to a second different host-side connection port on the docking station.

8. The method of claim 6, wherein the host computer includes an internal RAID card to interact with the select drive when the second path is selected.

9. The method of claim 6, wherein selecting one of the two selectable paths further comprises selecting the first path when the host computer is coupled to a first host-side connection interface and selecting the second path when the host computer is coupled to a second host-side connection interface.

10. The method of claim 6, wherein the docking station removably couples to the portable data pack.

11. The method of claim 6, wherein the docking station is configured for attachment to a vehicle.

12. The method of claim 6, wherein selecting one of the two selectable paths further comprises selecting a path with a multiplexor based on a value detected on a multiplexor selection line.

13. A storage assembly comprising:
a docking station configured to serve as an interface between a portable data pack and a host computer, the docking station including:
a plurality of drive-side connection ports each serving as a coupling to a corresponding one of multiple storage drives in the portable data pack;
a host-side connection interface to provide a physical and electrical coupling from the host computer to a first path of two selectable paths within the docking station to the drive-side connection ports via a RAID controller in the docking station, the host-side connection interface to further provide a second physical and electrical coupling from the host computer to a second path of the two selectable paths within the docking station to the drive-side connection ports bypassing the RAID controller in the docking station; and mode selection logic for directing communications in route between the host computer and a select drive of the multiple storage drives along one of the two selectable paths within the docking station, the first path of the two selectable paths transporting data of a first communication protocol input from the host computer and permitting the host computer and the select drive to bidirectionally communicate through the RAID controller of the docking station and the second path of the two selectable paths transporting data of a second communication protocol input from the host computer and permitting the host computer to bidirectionally communicate with the select drive through a RAID controller internal to the computer along a data channel that bypasses the RAID controller of the docking station.

14. The storage assembly of claim 13, wherein the mode selection logic is configured to:

select the first path of the two selectable paths when the host computer is coupled to a first host-side connection port on the docking station; and select the second path of the two selectable paths when the host computer is coupled to a second different host-side connection port on the docking station.

15. The storage assembly of claim 13, wherein the host-side connection interface is divided into a first host-side connection interface and a second host-side connection interface, and wherein the first path directs the communications to the first host-side interface and wherein the second path directs the communications to the second host-side interface.

* * * * *